United States Patent
Mueller et al.

(10) Patent No.: US 9,511,953 B1
(45) Date of Patent: Dec. 6, 2016

(54) SINGULATORS WITH PORTS FOR DIVERTING ITEMS

(71) Applicant: Amazon Technologies, Inc., Reno, NV (US)

(72) Inventors: Harald Mueller, Glendale, AZ (US); Louis George Smarzinski, Phoenix, AZ (US); Glenn Turnbull, Surprise, AZ (US); Jason Dean Grace, Goodyear, AZ (US); Jeffery Lynn Brazeal, Phoenix, AZ (US); Michael Jay Mills, Goodyear, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 14/037,725

(22) Filed: Sep. 26, 2013

(51) Int. Cl.
   *B65G 47/46* (2006.01)
   *B65G 47/30* (2006.01)
   *B65G 47/34* (2006.01)
   *B07B 13/075* (2006.01)
   *B07B 13/04* (2006.01)

(52) U.S. Cl.
   CPC ............... *B65G 47/46* (2013.01); *B07B 13/04* (2013.01); *B07B 13/075* (2013.01); *B65G 47/30* (2013.01); *B65G 47/34* (2013.01)

(58) Field of Classification Search
   CPC ...... B65G 47/46; B65G 47/30; B65G 47/34; B07B 13/04; B07B 13/07; B07B 13/075; B86G 47/46
   USPC .................................................. 209/634, 680
   See application file for complete search history.

(56) References Cited

U.S. PATENT DOCUMENTS

| | | | | |
|---|---|---|---|---|
| 3,019,898 A | * | 2/1962 | Bertinot | B07B 13/075 209/622 |
| 3,389,790 A | * | 6/1968 | Braunheim | A47L 21/02 209/680 |
| 3,675,770 A | * | 7/1972 | Ettlinger et al. | 209/682 |
| 3,776,378 A | * | 12/1973 | Booth | B07B 13/07 198/456 |
| 3,880,751 A | * | 4/1975 | Wirth | B65G 47/78 198/359 |
| 4,081,078 A | * | 3/1978 | Richardson | B65G 47/71 198/436 |
| 4,162,012 A | * | 7/1979 | Kupper | B07B 13/05 209/662 |
| 4,209,955 A | * | 7/1980 | Seragnoli | B65B 19/32 131/280 |
| 4,295,569 A | * | 10/1981 | Niederer | B07C 5/04 209/634 |
| 5,392,929 A | * | 2/1995 | Breach | B07B 13/04 209/156 |
| 5,497,887 A | * | 3/1996 | Hiebert | 209/538 |
| 5,769,204 A | * | 6/1998 | Okada | B65G 47/31 198/443 |
| 5,918,723 A | * | 7/1999 | Schuitema | B65G 47/5145 198/347.1 |
| 6,237,779 B1 | * | 5/2001 | Boyer | 209/680 |
| 6,401,936 B1 | * | 6/2002 | Isaacs et al. | 209/656 |
| 6,481,579 B2 | * | 11/2002 | Kennedy | B07C 5/3422 198/448 |
| 6,533,099 B2 | * | 3/2003 | Bonham | B65G 47/44 198/360 |
| 6,609,607 B2 | * | 8/2003 | Woltjer | B65G 37/02 198/457.03 |
| 7,004,303 B2 | * | 2/2006 | Rennie | B65G 47/30 198/459.5 |
| 7,121,399 B2 | * | 10/2006 | Mills | B07C 5/363 198/370.11 |
| 7,870,945 B2 | * | 1/2011 | Mileaf | 198/617 |

(Continued)

*Primary Examiner* — Thomas Randazzo
(74) *Attorney, Agent, or Firm* — Thomas Horstemeyer, LLP

(57) ABSTRACT

Disclosed are various embodiments for a singulator that has a port for diverting items. An item is received on at least one conveyor segment of a singulator. The item is transported using the at least one conveyor segment to a side wall of the singulator. The item is transported using the at least one conveyor segment through a port in the side wall of the singulator.

20 Claims, 6 Drawing Sheets

(56) References Cited

U.S. PATENT DOCUMENTS

| | | | | |
|---|---|---|---|---|
| 8,575,507 B2* | 11/2013 | Pippin | | B07C 1/02 209/584 |
| 2003/0221932 A1* | 12/2003 | Costanzo | | B65G 13/10 193/35 MD |
| 2004/0073333 A1* | 4/2004 | Brill | | B65G 47/38 700/224 |
| 2007/0090027 A1* | 4/2007 | Haselberger | | B07C 3/082 209/584 |
| 2007/0090028 A1* | 4/2007 | Varney | | B07C 3/00 209/584 |
| 2007/0246328 A1* | 10/2007 | Reznik | | B65G 43/10 198/444 |
| 2011/0022221 A1* | 1/2011 | Fourney | | 700/230 |
| 2011/0103929 A1* | 5/2011 | Zimmermann | | B07C 1/025 414/802 |
| 2011/0114448 A1* | 5/2011 | DePaso | | B65G 17/24 198/579 |
| 2014/0224622 A1* | 8/2014 | German | | 198/790 |

* cited by examiner

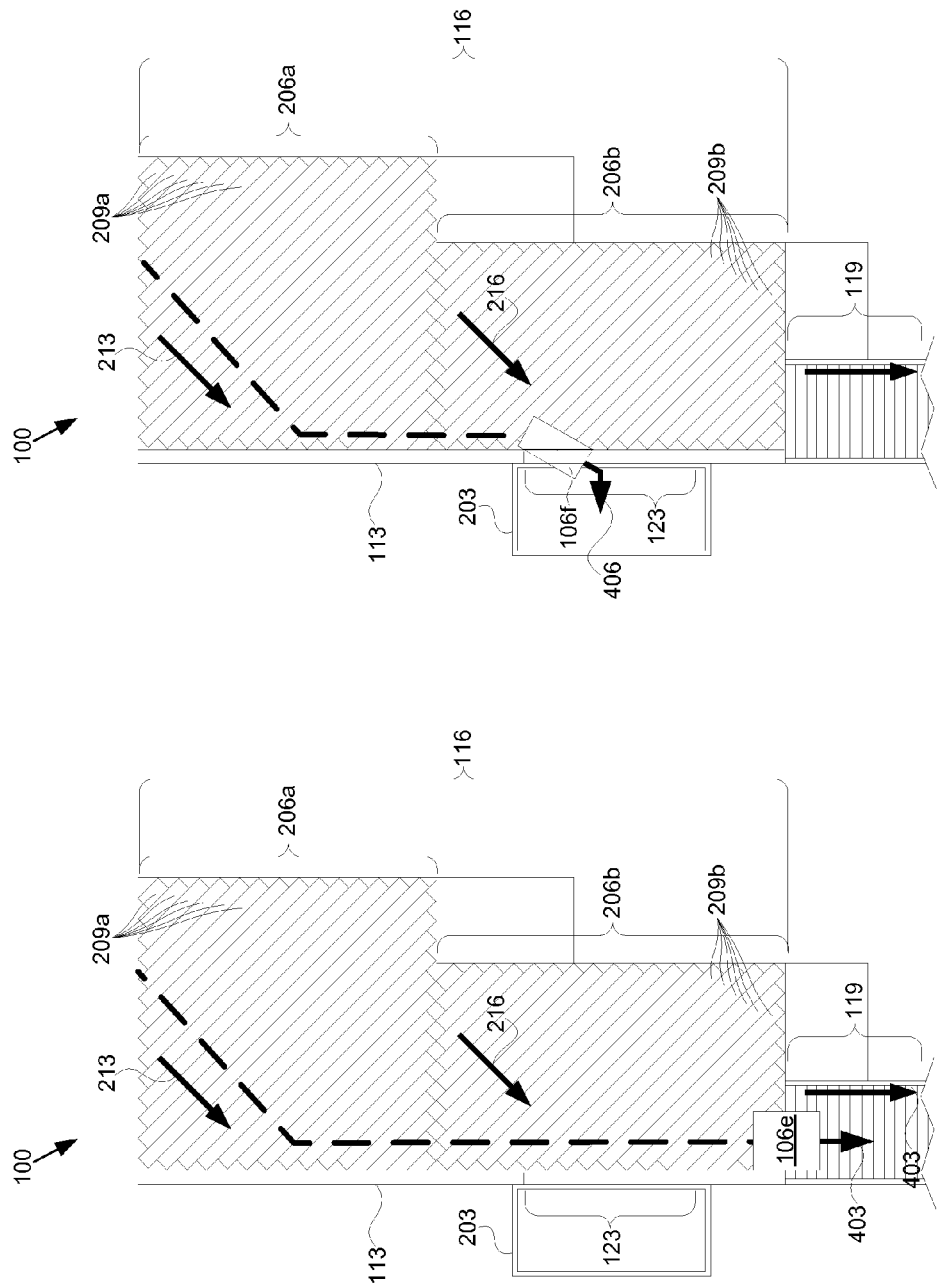

SINGULATORS WITH PORTS FOR DIVERTING ITEMS

BACKGROUND

An item can be loaded into a truck and shipped to a fulfillment center. Upon arrival of the item at a receiving area of the fulfillment center, the item may be unloaded from the truck and entered into the fulfillment center for storage. A conveyor system can be used to move the item from the truck and into the fulfillment center. Additionally, a conveyor system can be used to move the item within the fulfillment center to a storage location. Furthermore, a conveyor system can be used to move the item from its storage location to a shipping preparation station where the item is prepared for shipment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 4A-4B are drawings illustrating the travel of items through the conveyor system of FIG. 2 according to various embodiments of the present disclosure.

DETAILED DESCRIPTION

Figure 1:
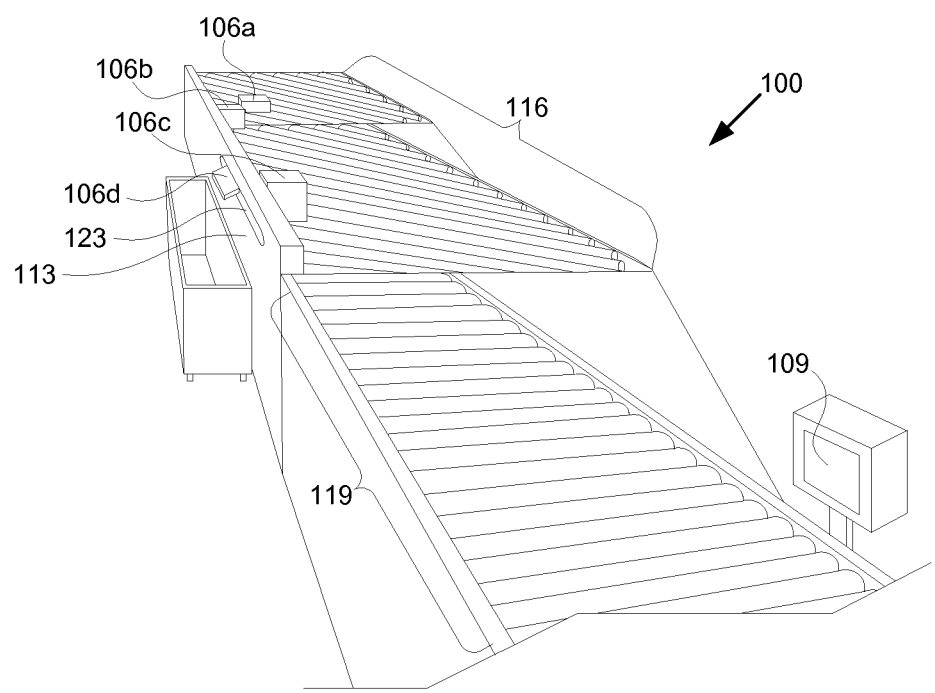
FIG. 1 is a drawing illustrating an example scenario involving a conveyor system according to various embodiments of the present disclosure.

The present disclosure relates to singulators that have ports for diverting items within conveyor systems. With reference to FIG. 1, shown is a non-limiting example of a portion of a conveyor system 100 being used to transport at least a subset of several items 106a-106d to an input device 109. The input device 109 may scan barcodes, Radio Frequency Identification (RFID) tags, Near Field Communication (NFC) tags, and/or any other identifiers that have been affixed to the items 106a-106d. To facilitate the identifiers on the items 106a-106d being scanned, it may be desirable for the items 106a-106c to pass the field of view of the input device 109 one at a time. As such, the conveyor system 100 transports the items 106a-106c to a side wall 113 of a singulator 116, and the items 106a-106c travel along the side wall 113 towards a conveyor path 119. As a result, the items 106a-106c may cross the field of view of the input device 109 one at a time. However, the item 106d has a relatively small thickness, and the dimensions of the item 106d may result in the item 106d jamming equipment in the conveyor system 100 if the item 106d were to travel on the conveyor path 119. As a result of the equipment being jammed, the conveyor system 100 may require a shutdown, manual intervention to clear the jam, and a restart of the conveyor system 100. However, in accordance with various embodiments of the present disclosure, the conveyor system 100 is configured to transport the item 106d to the side wall 113 of the singulator 116, and the item 106d travels along the side wall 113 until the item 106d is moved through a port 123 in the side wall 113. Thus, the item 106d may be diverted from traveling to the conveyor path 119. Thereafter, an identifier on the item 106d may be scanned manually and then provided to a subsequent section of the conveyor system 100. Thus, the input device 109 may scan the items 106a-106c, and the item 106d may be diverted from traveling to the conveyor path 119 to prevent the item 106d from interfering with the operation of equipment in the conveyor system 100.

In the following discussion, a general description of the system and its components is provided, followed by a discussion of the operation of the same.

Figure 2:
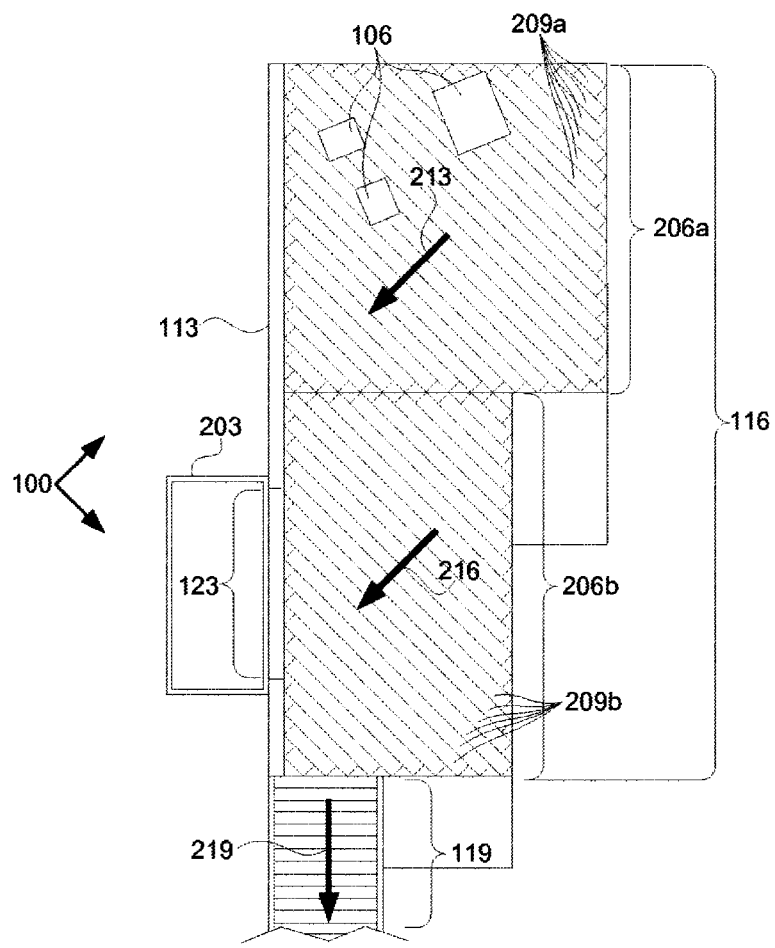
FIG. 2 is a drawing illustrating a conveyor system according to various embodiments of the present disclosure.

With reference to FIG. 2, shown is a top view of an example of a portion of a conveyor system 100 according to various embodiments of the present disclosure. The conveyor system 100 is configured to receive and transport multiple items 106 in an environment. Such an environment may be, for example, a fulfillment center where the items 106 are stored and prepared for shipment. The items 106 may be, for example, physical products that may or may not be packaged in a packaging container, such as a cardboard box. In some embodiments, the items 106 may be packaged products that are stored in a fulfillment center to await purchase, lease, trade, etc.

The conveyor system 100 in the example shown in FIG. 2 comprises a singulator 116, a conveyor path 119, a container 203, and potentially other components. The singulator 116 is a portion of the conveyor system 100 that may singulate two or more of the items 106 with respect to each other. In this regard, the singulator 116 may move two or more of the items 106 so that the two or more items 106 are single file with respect to each other.

The singulator 116 may include one or more conveyor segments 206a-206b, a side wall 113, and potentially other components. The conveyor segments 206a-206b may be portions of the singulator 116 that are configured to transport the items 106 towards the side wall 113 and towards the end of the singulator 116 that is proximate to the conveyor path 119. To this end, the conveyor segments 206a-206b in the embodiment shown in FIG. 2 include rollers 209a-209b. It is noted only a portion of the rollers 209a-209b have been labeled in FIG. 2 for the purpose of clarity. The rollers 209a-209b are configured to move the items 106 across the respective conveyor segments 206a-206b. To this end, the rollers 209a-209b may be passive or driven according to various embodiments. In alternative embodiments, the conveyor segments 206a-206b may comprise one or more belts, tilted tables, tracks, and/or any other suitable passive or driven conveyor mechanism instead of or in addition to the rollers 209a-209b.

The longitudinal axes of the rollers 209a of the first conveyor segment 206a are skewed with respect to the side wall 113 so that the rollers 209a may rotate in the direction indicated by the first arrow 213. In this regard, the longitudinal axes of the rollers 209a are not normal or parallel to the side wall 113. As a result, when an item 106 is on the first conveyor segment 206a, the rollers 209a may move the item 106 to the side wall 113 and then along the side wall 113 towards the second conveyor segment 206b.

Similarly, the longitudinal axes of the rollers 209b of the second conveyor segment 206b are skewed with respect to the side wall 113 so that the rollers 209b rotate in the direction as indicated by the second arrow 216. In this regard, the longitudinal axes of the rollers 209b are not normal or parallel to the side wall 113. As a result, when an item 106 is on the second conveyor segment 206b, the rollers 209b may push the item 106 to the side wall 113 and then along the side wall 113 towards the conveyor path 119. As a result, two or more items 106 may exit the second conveyor segment 206b onto the conveyor path 119 in a single file fashion. In this way, the singulator 116 may singulate at least some of the items 106.

The side wall 113 may be, for example, a panel, a bar, or any other type of suitable structure that facilitates the singulation of the items 106. As will be described in more detail below, the singulator 116 may be configured so that the items 106 are moved into contact with the side wall 113. As such, the top of the side wall 113 may be positioned vertically above the top of the rollers 209a-209b on which the items 106 may travel.

The side wall 113 in various embodiments may include a port 123 through which one or more items 106 may travel. The port 123 may be, for example, and opening through the side wall 113 that is embodied in the form of an elongated slot or any other suitable shape. As will be discussed in more detail below, the port 123 may be sized, shaped, and/or positioned so that particular ones of the items 106 are diverted into the port 123.

The conveyor path 119 may be a portion of the conveyor system 100 that receives one or more of the items 106 that have been singulated by singulator 116. As such, the conveyor path 119 in the embodiment shown in FIG. 2 is proximate to the end of the singulator 116 from which one or more of the items 106 leave the singulator 116. The conveyor path 119 may also transport one or more of the items 106 to another segment of the conveyor system 100. For example, the conveyor path 119 in some embodiments may transport one or more of the items 106 to a scanning station where identifiers on the items 106 may be read by an input device 109 (FIG. 1). Additionally or alternatively, the conveyor path 119 may transport one or more of the items 106 to a sorter station where the items 106 are sorted according to various criteria. As such, the conveyor path 119 may comprise, for example one or more belts, rollers, tracks, tables, and/or any other suitable type of passive or driven conveying mechanisms. The conveyor path 119 that is shown in FIG. 2 is configured to move an item 106 in the direction indicated by the third arrow 219.

The container 203 may be a receptacle that is configured to receive an item 106 after the item has been transported through the port 123. As such, the container 203 in various embodiments may be proximate to the side wall 113 and the top opening of the container 203 may be positioned vertically below and adjacent to the port 123. In such embodiments, an item 106 may travel through the port 123 and then fall into the container 203. In some embodiments, the container 203 may comprise wheels to facilitate moving the container 203 and several items 106 therein. In alternative embodiments, a conveyor belt or other type of conveyor mechanism, instead of the container 203, may be positioned proximate to the port 123 to receive one or more of the items 106 that have been diverted.

Figure 3A:
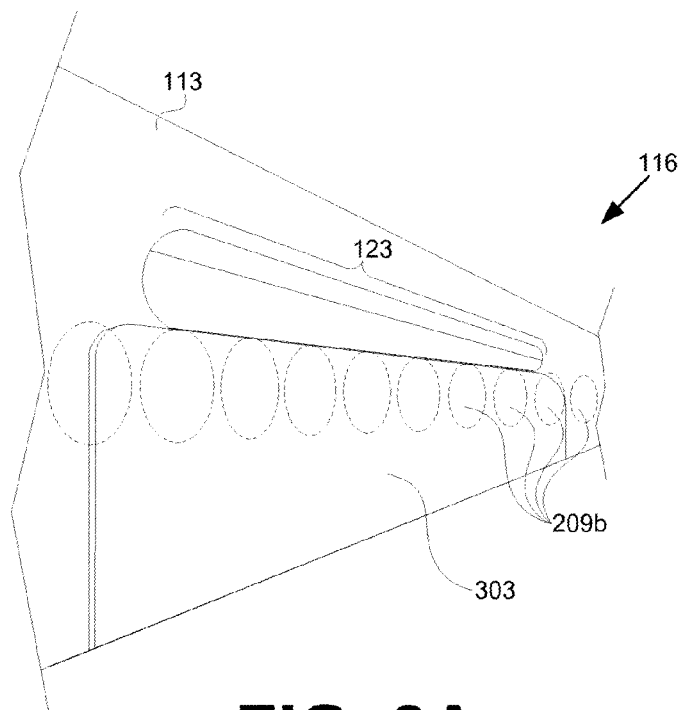
FIGS. 3A-3B are drawings illustrating a portion of the conveyor system of FIG. 2 according to various embodiments of the present disclosure.
Figure 3B:
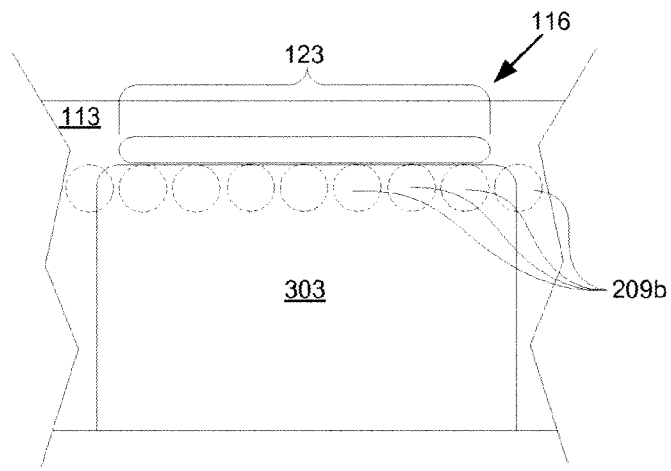

With reference to FIGS. 3A-3B, shown is an example of a portion of the singulator 116 according to various embodiments of the present disclosure. In particular, FIGS. 3A-3B show a portion of the side wall 113, a subset of the rollers 209b, and the port 123. It is noted that only a subset of the rollers 209b shown in FIGS. 3A-3B have been labeled for the purpose of clarity.

The port 123 in the embodiment shown in FIGS. 3A-3B is embodied in the form of an elongated slot. As such, the horizontal length of the port 123 is greater than the vertical height of the opening of the port 123. The vertical height of the opening of the port 123 (e.g., the distance between the bottom edge and the top edge of the port 123) may be selected based on the thickness of the items 106 that are to be transported through the port 123. As a non-limiting example, if it has been determined that items 106 with a thickness less than or equal to H units are to be diverted into the port 123, the vertical height of the opening of the port 123 may be chosen to be approximately H units. As a result, items 106 with a thickness less than or equal to H units may travel through the port 123, and items 106 with a thickness greater than H units may be prevented from traveling through the port 123. As a non-limiting example, the horizontal length of the port 123 may be about 107 inches, and the vertical height of the opening of the port 123 may be about 1 inch.

In the embodiment shown in FIGS. 3A-3B, the bottom edge of the port 123 is substantially level with the top portion of the rollers 209b. Additionally, the port 123 in the embodiment shown has rounded ends. In alternative embodiments, the shape of the port 123 may be, for example, circular, rectangular, or any other suitable shape.

In various embodiments, the side wall 113 may have multiple ports 123, and each opening of the ports 123 may have a different vertical height. Additionally, in some embodiments, the vertical heights of the openings of the multiple ports 123 may successively increase or successively decrease. As a non-limiting example, a first port 123 may have an opening with a vertical height of a units, a second port 123 may have an opening with a vertical height of a+b units, a third port 123 may have an opening with a vertical height of a+2*b units and so forth, wherein a and b are particular values. In this way, items 106 may be diverted and separated from the singulator 116 based on the respective thicknesses of the items 106.

In some embodiments, one or more reinforcement panels 303 may be attached to the side wall 113. The reinforcement panel 303 may provide structural strength for the portion of the side wall 113 where the port 123 is located.

With reference to FIGS. 4A-4B, examples of at least a portion of the operation of the conveyor system 100 are provided. In the following discussion, it is assumed that the singulator 116 and the conveyor path 119 are powered and operating. In addition, it is assumed that the item 106e in FIG. 4A has a thickness that is greater than the vertical height of the opening of the port 123. Furthermore, it is assumed that the item 106f in FIG. 4B has a thickness that is less than the vertical height of the opening of the port 123.

With reference to FIG. 4A, the arrow 403 represents the path that the item 106e may travel according to various embodiments of the present disclosure. Upon the item 106e being provided to the first conveyor segment 206a, the rollers 209a may transport the item 106e from its initial position at the tail of the arrow 403 towards the side wall 113. In particular, the rollers 209a may move the item 106e in the direction indicated by the first arrow 213. After the item 106e has contacted the side wall 113, the rotation of the rollers 209a may cause the item 106e to move and/or rotate so that a side of the item 106e is parallel to the side wall 113.

Additionally, the rotation of the rollers 209a may transport the item 106e along the side wall 113 towards the second conveyor segment 206b.

After the item 106e has been transported from the first conveyor segment 206a to the second conveyor segment 206b, the rollers 209b may transport the item 106e along the side wall 113 towards the conveyor path 119. Because the thickness of the item 106e is greater than the vertical height of the opening of the port 123, the item 106e is prevented from being diverted into the port 123. Thus, the item 106e may travel along the side wall 113 and pass the port 123. After the item 106e has been moved past the port 123, the item 106e may continue to travel along the side wall 113 to the conveyor path 119.

After the item 106e has arrived on the conveyor path 119, the item 106e may travel to a subsequent segment of the conveyor system 100. For example, the item 106e may travel to a scanning station, a sorter, and/or any other segment of the conveyor system 100.

With reference to FIG. 4B, the arrow 406 represents the path that the item 106f may travel according to various embodiments of the present disclosure. Upon the item 106f being provided to the first conveyor segment 206a, the rollers 209a may transport the item 106f from its initial position at the tail of the arrow 406 towards the side wall 113. In particular, the rollers 209a may move the item 106e in the direction indicated by the first arrow 213. After the item 106f has contacted the side wall 113, the rotation of the rollers 209a may cause the item 106f to move and/or rotate so that a side of the item 106f is parallel to the side wall 113. Additionally, the rotation of the rollers 209a may transport the item 106f along the side wall 113 towards the second conveyor segment 206b.

After the item 106f has been transported from the first conveyor segment 206a to the second conveyor segment 206b, the rollers 209b may transport the item 106f along the side wall 113 towards the conveyor path 119. Because the thickness of the item 106f is less than the vertical height of the opening of the port 123, the rotation of the rollers 209b may move the leading edge of the item 106f into the port 123. As the item 106f continues to move towards the conveyor path 119, the rotation of the rollers 209b may move more of the item 106f into the port 123. Eventually, the entire item 106f may travel into and through the port 123, and the item 106f may fall into the container 203. From time to time, a worker may obtain any items 106f that may have been diverted into the container 203. The items 106f that have been obtained from the container 203 may be processed manually and/or provided to a subsequent portion of the conveyor system 100.

Figure 5:
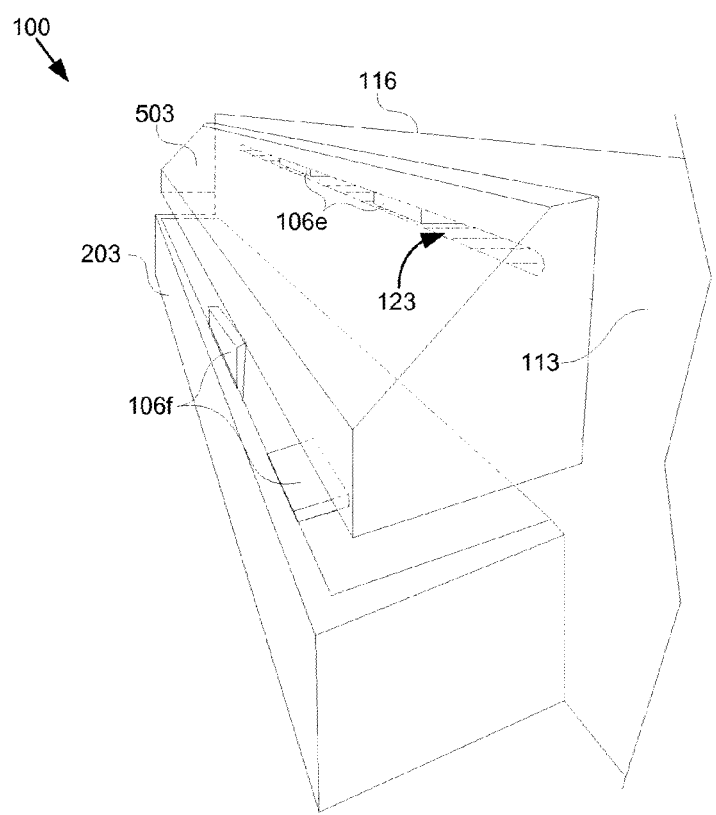
FIG. 5 is a drawing illustrating a guard for a port in the conveyor system of FIG. 2 according to various embodiments of the present disclosure.

With reference to FIG. 5, shown is a drawing showing a guard 503 for the conveyor system 100 according to various embodiments of the present disclosure. The guard 503 may restrict objects, such as a human arm or other human body part, from being inserted into the port 123. For example, the guard 503 in the embodiment shown in FIG. 5 is embodied as a hood that covers the port 123. In alternative embodiments, the guard 503 may be embodied in the form of, for example, a door, a flap, and/or any other type of cover for the port 123.

The guard 503 in various embodiments may be transparent to visible light so that workers may inspect the singulator 116, the container 203, and/or other components associated with the conveyor system 100. To this end, the guard 503 may be constructed of, for example, one or more clear polycarbonate panels, clear acrylic panels, and/or any other suitable material.

Figure 6:
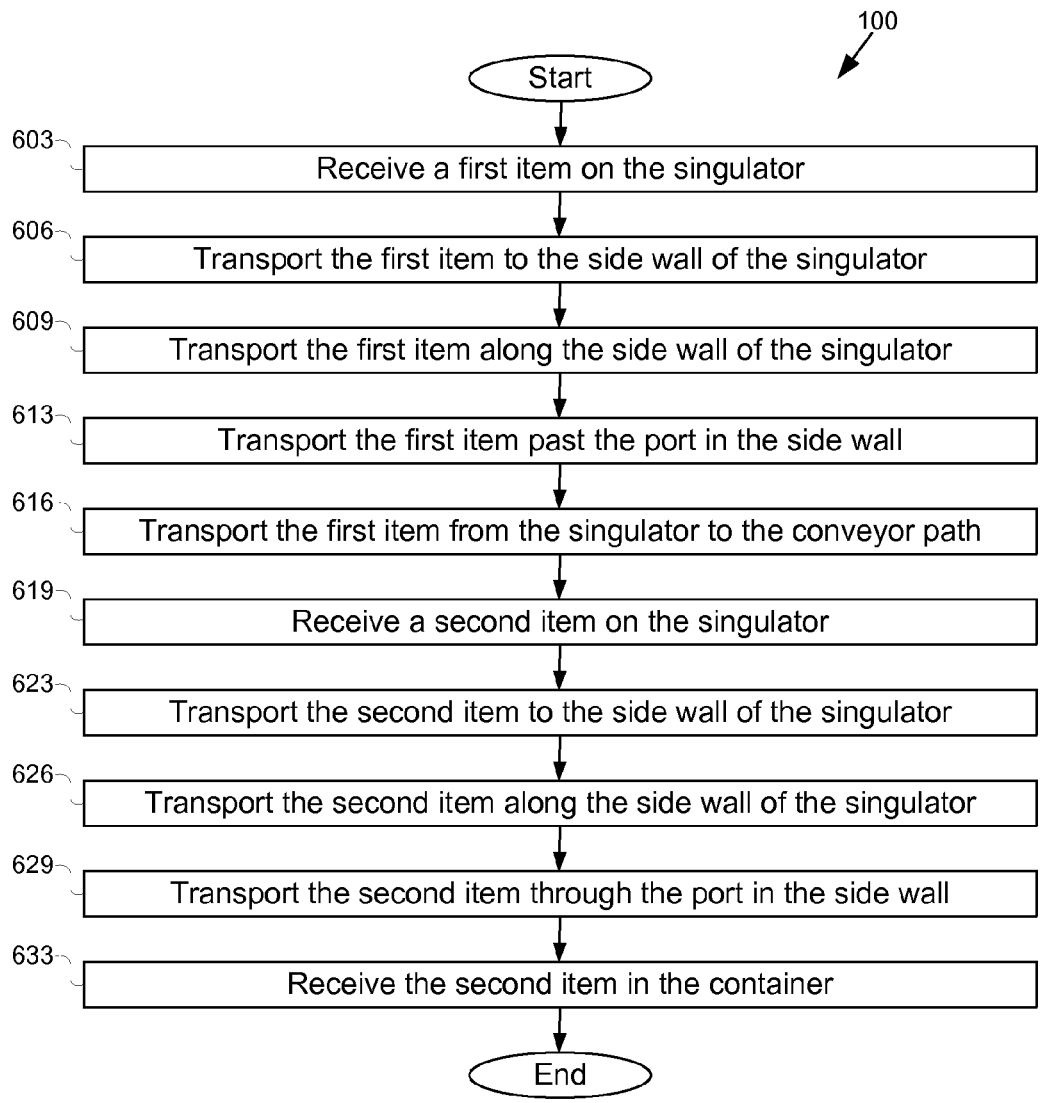
FIG. 6 is a flowchart illustrating an example of functionality performed by the conveyor system of FIG. 2 according to various embodiments of the present disclosure.

With reference to FIG. 6, shown is a flowchart that represents an example of a portion of the operation of the conveyor system 100 according to various embodiments. It is understood that the flowchart of FIG. 6 provides merely an example of the many different types of functional arrangements that may be employed by the conveyor system 100. The flowchart of FIG. 6 may be viewed as representing an example of elements of a method implemented by the conveyor system 100 according to one or more embodiments.

Beginning with box 603, the conveyor system 100 receives a first item 106e (FIG. 4A) on the singulator 116 (FIG. 4A). For example, the first item 106e may be placed on the first conveyor segment 206a (FIG. 4A) of the singulator 116. As shown in box 606, the conveyor system 100 transports the first item 106e to the side wall 113 (FIG. 4A) of the singulator 116. To this end, the rollers 209a may rotate to move the item 106e in the direction indicated by the first arrow 213 (FIG. 4A).

As indicated at box 609, the conveyor system 100 then transports the first item 106e along the side wall 113 of the singulator 116. Additionally, the item 106e may move from the first conveyor segment 206a to the second conveyor segment 206b of the singulator 116. The first item 106e is then transported past the port 123 (FIG. 6) in the side wall 113, as indicated at box 613. Thereafter, the first item 106e is transported from the singulator 116 to the conveyor path 119 (FIG. 4A), as indicated at box 616.

At box 619, the conveyor system 100 receives a second item 106f (FIG. 4B) on the singulator 116. For instance, the second item 106f may be placed on the first conveyor segment 206a. The second item 106f is then transported to the side wall 113 of the singulator 116, as shown at box 623. For example, the rollers 209a may move the item 106f in the direction indicated by the first arrow 213. As indicated at box 626, the second item 106f is transported along the side wall 113 of the singulator 116.

The second item 106f is then transported through the port 123 in the side wall 113, as shown at box 629. Thus, the second item 106f is diverted from moving onto the conveyor path 119. As indicated at box 633, the second item 106f may then be received in the container 203. In alternative embodiments, a conveyor belt or other type of conveying mechanism may receive the second item 106f and transport the second item 106f to another location. Thereafter, the process ends.

Although the flowchart of FIG. 6 shows a specific order of performance, it is understood that the order of performance may differ from that which is depicted. For example, the order of performance of two or more boxes shown in FIG. 6 may be scrambled relative to the order shown. Also, two or more boxes shown in succession in FIG. 6 may be performed concurrently or with partial concurrence. Further, in some embodiments, one or more of the boxes shown in FIG. 6 may be skipped or omitted. It is understood that all such variations are within the scope of the present disclosure.

It is understood that numerical values may be provided herein as merely non-limiting examples, and thus, should be interpreted in a flexible manner to include not only the numerical values explicitly recited, but other values as well. To illustrate, a numerical value of "about 1 unit" should be interpreted to include not only the explicitly recited numerical value, but to include other values.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a singulator that comprises:
        a side wall having a slot that forms an opening in the side wall, the slot having a horizontal length that is greater than a vertical height associated with the slot;
        a guard that covers a portion of the slot in the side wall and restricts access to the singulator through the slot; and
        at least one conveyor segment configured to:
            transport a first packaged product along at least a portion of the at least one conveyor segment using a plurality of driven rollers having a plurality of axes that are skewed relative to the side wall;
            transport the first packaged product along the side wall past the slot to an end of the at least one conveyor segment;
            transport a second packaged product along at least a portion of the at least one conveyor segment using the plurality of driven rollers; and
            transport the second packaged product through the slot in the side wall.

2. The system of claim 1, wherein the system further comprises a container that receives the second packaged product after the second packaged product is transported through the slot in the side wall.

3. The system of claim 1, wherein the guard comprises a material that is transparent to light.

4. The system of claim 1, wherein:
    the side wall further comprises an additional slot that forms an additional opening in the side wall; and
    the conveyor is configured to transport a third item through the additional slot.

5. The system of claim 1, wherein the slot comprises a round end.

6. The system of claim 1, wherein the singulator further comprises a reinforcement panel that is attached to the side wall.

7. The system of claim 1, wherein a bottom edge of the slot in the side wall is substantially level with a top surface of the plurality of driven rollers.

8. The system of claim 1, wherein the singulator is configured to align the first packaged product with a plurality of additional packaged products in a single row.

9. The system of claim 1, wherein the guard comprises at least one of a door or a flap that covers the slot that forms the opening in the side wall.

10. The system of claim 1, wherein the slot comprises a vertical height configured to allow the second packaged product, but not the first packaged product, to be transported through the slot.

11. A system, comprising:
    a singulator that comprises:
        a side wall having a slot that forms an opening in the side wall, the slot having a horizontal length that is greater than a vertical height associated with the slot;
        a guard that covers a portion of the slot in the side wall and restricts access to the singulator through the slot; and
        at least one conveyor segment configured to:
            receive a first packaged product;
            transport the first packaged product to be positioned against the side wall by at least forcing the first packaged product along at least a portion of the at least one conveyor segment using a plurality of driven rollers having a plurality of axes that are skewed relative to the side wall;
            transport the first packaged product along the side wall past the slot to an end of the at least one conveyor segment;
            receive a second packaged product;
            transport the second packaged product to be positioned against the side wall by at least forcing the second packaged product along the at least a portion of the at least one conveyor segment using the plurality of driven rollers;
            transport the second packaged product along the side wall to the slot; and
            transport the second packaged product through the slot part instead of to the end of the at least one conveyor segment; and
    a container positioned proximate to the side wall and adjacent to the slot, the container being configured to receive the second packaged product after the second packaged product is transported through the slot in the side wall.

12. The system of claim 11, further comprising a conveyor path positioned proximate to the end of the singulator, the conveyor path being configured to:
    receive the first packaged product from the singulator; and
    transport the first packaged product to a scanning station.

13. The system of claim 11, wherein the guard comprises a door that covers the slot.

14. The system of claim 11, wherein the guard comprises a flap that covers the slot that forms the opening in the side wall.

15. The system of claim 14, wherein the flap comprises at least one of a polycarbonate panel or an acrylic panel.

16. A method, comprising:
    receiving a first packaged product on at least one conveyor segment of a singulator;
    transporting the first packaged product to a side wall of the singulator by at least forcing the first packaged product along at least a portion of the at least one conveyor segment using a plurality of driven rollers having a plurality of axes that are skewed relative to the side wall;
    transporting, using the at least one conveyor segment, the first packaged product through a slot that forms an opening in the side wall, the slot having a horizontal length that is greater than a vertical height associated with the slot, the slot having a guard that covers a portion of the slot in the side wall and restricts access to the singulator through the slot;
    receiving a second packaged product on the at least one conveyor segment of the singulator;
    transporting the second packaged product to the side wall of the singulator by at least forcing the second packaged product along the at least a portion of the at least one conveyor segment using the plurality of driven rollers having the plurality of axes that are skewed relative to the side wall;

transporting, using the at least one conveyor segment, the second packaged product along the side wall; and transporting, using the at least one conveyor segment, the second packaged product past the slot to an end of the at least one conveyor segment.

17. The method of claim 16, further comprising transporting, using the at least one conveyor segment, the first packaged product along the side wall of the singulator prior to transporting the first packaged product through the slot.

18. The method of claim 16, further comprising transporting the second packaged product from the end of the at least one conveyor segment to a scanning station.

19. The method of claim 16, further comprising receiving the first packaged product in a container that is located below the side wall of the singulator.

20. The method of claim 16, wherein a thickness of the first packaged product is less than or equal to a vertical height of the slot.

\* \* \* \* \*